US011176015B2

(12) United States Patent
Rallapalli et al.

(10) Patent No.: US 11,176,015 B2
(45) Date of Patent: Nov. 16, 2021

(54) LOG MESSAGE ANALYSIS AND MACHINE-LEARNING BASED SYSTEMS AND METHODS FOR PREDICTING COMPUTER SOFTWARE PROCESS FAILURES

(71) Applicant: Optum Technology, Inc., Eden Prairie, MN (US)

(72) Inventors: Sruti Rallapalli, Hyderabad (IN); Swapna Sourav Rout, Bangalore (IN)

(73) Assignee: Optum Technology, Inc., Eden Prairie, MN (US)

( * ) Notice: Subject to any disclaimer, the term of this patent is extended or adjusted under 35 U.S.C. 154(b) by 83 days.

(21) Appl. No.: 16/696,670

(22) Filed: Nov. 26, 2019

(65) Prior Publication Data

US 2021/0157665 A1 May 27, 2021

(51) Int. Cl.
*G06F 11/30* (2006.01)
*G06N 20/00* (2019.01)

(52) U.S. Cl.
CPC ...... *G06F 11/3072* (2013.01); *G06F 11/3068* (2013.01); *G06N 20/00* (2019.01)

(58) Field of Classification Search
CPC ............. G06F 11/3068; G06F 11/3072; G06F 11/3075; G06F 11/3082; G06F 11/3447; G06F 11/3452; G06N 20/00; G06K 9/6218; G06K 9/6222; G06K 9/6223; G06K 9/6221; G06K 9/622; G06K 9/6256; G06K 9/6225
See application file for complete search history.

(56) References Cited

U.S. PATENT DOCUMENTS 5,463,768 A 10/1995 Cuddihy et al.
8,032,866 B1 10/2011 Golender et al.
9,294,631 B1 * 3/2016 Cogan .................. H04M 15/70
2005/0149297 A1 * 7/2005 Guralnik ........... G05B 23/0254 702/189
2007/0101202 A1 * 5/2007 Garbow ............. G06F 11/0709 714/47.2
2010/0223499 A1 * 9/2010 Panigrahy ............ G06F 11/079 714/19
2015/0363196 A1 12/2015 Carback, III et al.
2016/0210224 A1 7/2016 Cohen et al.
(Continued)

*Primary Examiner* — Gabriel Chu
(74) *Attorney, Agent, or Firm* — Alston & Bird LLP

(57) ABSTRACT

In general, embodiments of the present invention provide methods, apparatus, systems, computing devices, computing entities, and/or the like for software process failure prevention are provided herein. Such embodiments may include steps of: generating error logs at one or more phases of a software process lifecycle; preprocessing each error log to standardize error log data; grouping the preprocessed error logs based on similar characteristics of the preprocessed error logs; associating each group of preprocessed error logs with one or more discrete events of the software process lifecycle; converting each preprocessed error log into a sequence of associated discrete events of the software process lifecycle; merging redundant sequences of associated discrete events of the software process lifecycle; and identifying one or more error causing patterns for software process failure prediction from the sequences of associated discrete events of the software process lifecycle.

18 Claims, 10 Drawing Sheets

1010 Generate error log messages within an error log at one or more phases of a process lifecycle 1020 Preprocess error logs to standardize error log data 1030 Group preprocessed error log messages based on similar characteristics 1040 Associate each group of preprocessed error log messages with one or more discrete events in the process lifecycle 1050 Convert each preprocessed error log into a sequence of associated discrete events in the process lifecycle 1060 Merge redundant sequences of associated discrete events in the process lifecycle 1070 Identify error patterns for failure prediction from the associated discrete events in the process lifecycle

(56) References Cited

U.S. PATENT DOCUMENTS

| | | | | |
|---|---|---|---|---|
| 2016/0239756 | A1* | 8/2016 | Aggour | H04L 41/147 |
| 2017/0293542 | A1 | 10/2017 | Xu et al. | |
| 2019/0097873 | A1* | 3/2019 | Nucci | H04L 41/147 |
| 2020/0174870 | A1* | 6/2020 | Xu | G06K 9/6256 |
| 2020/0183805 | A1* | 6/2020 | Togawa | G06F 11/3075 |
| 2020/0184355 | A1* | 6/2020 | Mehta | H04L 41/16 |
| 2021/0027205 | A1* | 1/2021 | Sevakula | G06F 11/327 |

* cited by examiner

106

102

900

LOG MESSAGE ANALYSIS AND MACHINE-LEARNING BASED SYSTEMS AND METHODS FOR PREDICTING COMPUTER SOFTWARE PROCESS FAILURES

BACKGROUND

In a typical engineering pipeline, the number of software processes (also referred to herein as "jobs") executing within a computing environment can range from hundreds to millions, and therefore detailed monitoring of each software process can require significant resources to determine when a particular software process fails. However, in certain instances, abnormal termination of one or more software processes may severely impair operations, particularly for one or more software processes that operate in an interrelated configuration and therefore detailed monitoring is often desired. Furthermore, resolving such terminations in accordance with traditional problem resolutions may require extreme efforts from operational teams that may ultimately result in human error that can exacerbate problems caused by the original abnormal termination. Various embodiments of the present invention seek to remedy these and other issues of error handling systems.

BRIEF SUMMARY

Various embodiments relate to systems and methods for monitoring the status of different software processes in an engineering pipeline and predicting potential abnormalities or failures in the status of such software processes. In general, embodiments of the present invention provide methods, apparatus, systems, computing devices, computing entities, and/or the like for software process failure prevention. Such embodiments may include steps of: generating error log messages within one or more error logs at one or more phases of a software process lifecycle; preprocessing each error log to standardize error log data; grouping the preprocessed error log messages based on similar characteristics of the preprocessed error logs; associating each group of preprocessed error log messages with one or more discrete events of the software process lifecycle; converting each preprocessed error log into a sequence of associated discrete events of the software process lifecycle; compressing sequences of associated discrete events of the software process lifecycle; and identifying one or more error causing patterns for software process failure prediction from the sequences of associated discrete events of the software process lifecycle.

In certain embodiments, each error log further comprises one or more of: a code identifier identifying error causing code, one or more line numbers associated with identified error causing code, a retrieval data source identifier, and identification of one or more queries executed to attempt to access the one or more data sources tables. Moreover, in various embodiments, preprocessing each error log to standardize error log data comprises one or more of: removing one or more punctuation marks from each error log; tokenizing text in each error log creating one or more error log tokens; identifying one or more error log tokens representing script names in each error log; masking the identified one or more error log tokens; identifying one or more data source identifiers represented as character sequences in each error log; masking the identified one or more data source identifiers; identifying one or more software process identifiers within each error log; masking the identified one or more software process identifiers; parsing each error log to identify one or more data acquisition queries; and extracting one or more data source identifiers of interest and one or more attributes of interest associated with the identified one or more data acquisition queries. In certain embodiments, the method for software process failure prediction further comprises storing the identified one or more error causing patterns from the sequences of associated discrete events of the software process lifecycle in association with data identifying corresponding predicted failures. In certain embodiments, identifying one or more error causing patterns from the sequences of associated discrete events of the software process lifecycle further comprises applying a deep learning model to create predicted sequences of associated discrete events associated with one or more errors in the software process lifecycle.

In various embodiments, the method further comprises identifying one or more error causing patterns from the sequences of associated discrete events of the software process lifecycle using a weighted Bayesian variational inference model, wherein the sequences of associated discrete events of the software process lifecycle represent concurrent software processes. In various embodiments, the weighted Bayesian variational inference model further provides an error probability for sequences of associated discrete events of the software process lifecycle. Moreover, the weighted Bayesian variational inference model may further weights provided inputs for sequences of associated discrete events of the software process lifecycle. In certain embodiments, each associated discrete event of the software process lifecycle corresponds to a software process state associated with the associated discrete event. In certain embodiments, grouping the preprocessed error logs further comprises: determining a number of groups to characterize the preprocessed error logs using gap statistics; and grouping the preprocessed error logs into the determined number of groups using k-means algorithms such that each grouping corresponds to a similar activity performed during the software process lifecycle. In various embodiments, each error log comprises a description of at least one fatal software process error. In certain embodiments, preprocessing each error log to standardize error log data further comprises extracting data from each error log based on a keyword search. In various implementations of the method for software process failure prediction, preprocessing each error log to standardize error log data further comprises: identifying the one or more error log tokens representing script names in each error log by using one or more expressions built for a fixed set of script extensions. In certain embodiments, the error logs are formatted based on the phase at which they are respectively generated.

Various embodiments are directed to an apparatus for software process failure prediction, the apparatus comprising at least one processor and at least one memory including program code, the at least one memory and the program code configured to, with the processor, cause the apparatus to at least: generate error log messages within one or more error logs at one or more phases of a software process lifecycle; preprocess each error log to standardize error log data; group the preprocessed error log messages based on similar characteristics of the preprocessed error logs; identify, based at least in part on groups of preprocessed error log messages, one or more discrete events of the software process lifecycle; convert a plurality of the preprocessed error logs into a sequence of associated discrete events of the software process lifecycle; compressing sequences of associated discrete events of the software process lifecycle; and identify one or more error causing patterns for software process failure prediction from the sequences of associated discrete events of the software process lifecycle.

In certain embodiments, the program code is further configured to, with the processor, cause the apparatus to at least: remove one or more punctuation marks from each error log; tokenize text in each error log creating one or more error log tokens; identify one or more error log tokens representing script names in each error log; mask the identified one or more error log tokens; identify one or more data source identifiers represented as character sequences in each error log; mask the identified one or more data source identifiers; identify one or more software process identifiers within each error log; mask the identified one or more software process identifiers; parse each error log to identify one or more data acquisition queries; and extract one or more data source identifiers of interest and one or more attributes of interest associated with the identified one or more data acquisition queries. In certain embodiments, the program code is further configured to, with the processor, cause the apparatus to at least: apply a deep learning algorithm to create predicted sequences of associated discrete events associated with one or more errors in the software process lifecycle.

Various embodiments are directed to a computer program product for software process failure prediction, the computer program product comprising at least one non-transitory computer-readable storage medium having computer-readable program code portions stored therein, the computer-readable program code portions configured to: generate error log messages within one or more error logs at one or more phases of a software process lifecycle; preprocess each error log to standardize error log data; group the preprocessed error log messages based on similar characteristics of the preprocessed error logs; identify, based at least in part on groups of preprocessed error log messages, one or more discrete events of the software process lifecycle; convert a plurality of the preprocessed error logs into a sequence of associated discrete events of the software process lifecycle; compressing sequences of associated discrete events of the software process lifecycle; and identify one or more error causing patterns for software process failure prediction from the sequences of associated discrete events of the software process lifecycle.

In certain embodiments, the computer-readable program code portions are further configured to: remove one or more punctuation marks from each error log; tokenize text in each error log creating one or more error log tokens; identify one or more error log tokens representing script names in each error log; mask the identified one or more error log tokens; identify one or more data source identifiers represented as character sequences in each error log; mask the identified one or more data source identifiers; identify one or more software process identifiers within each error log; mask the identified one or more software process identifiers; parse each error log to identify one or more data acquisition queries; and extract one or more data source identifiers of interest and one or more attributes of interest associated with the identified one or more data acquisition queries.

BRIEF DESCRIPTION OF THE DRAWINGS

Figure 1:
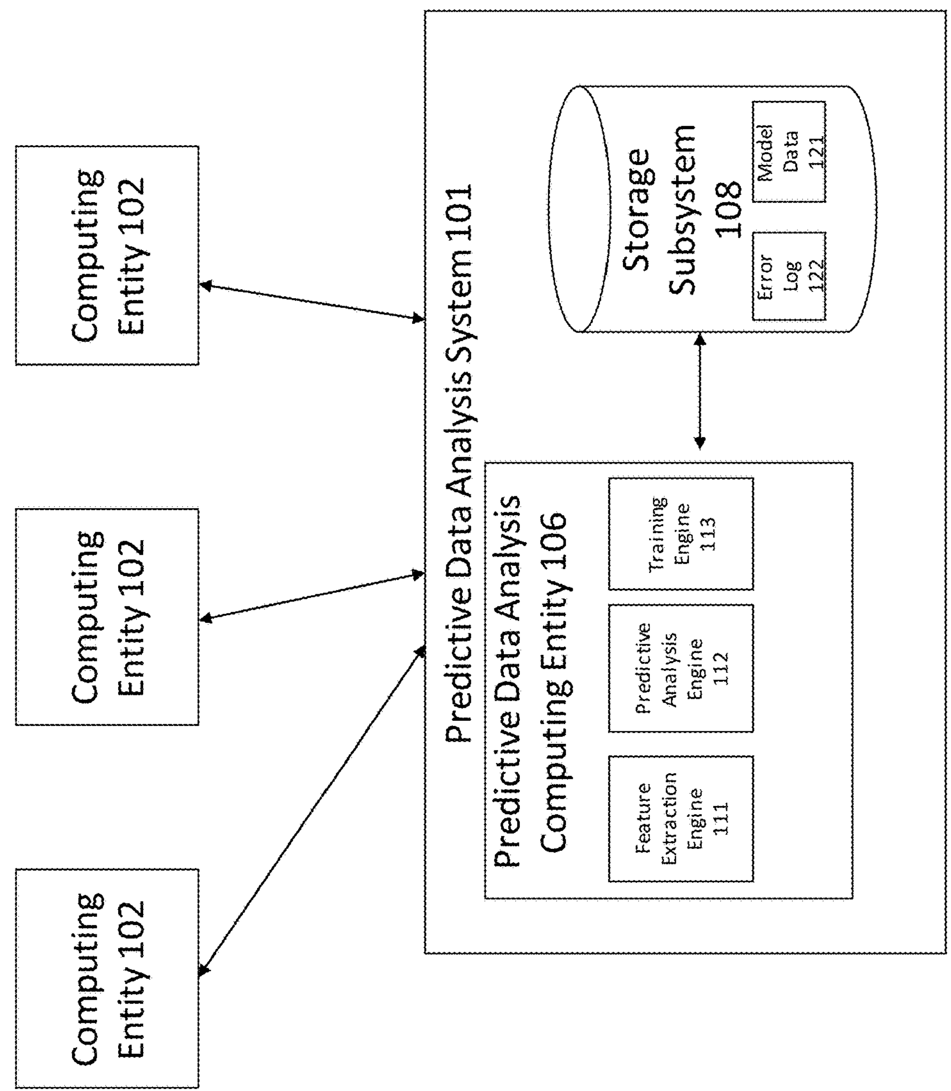

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
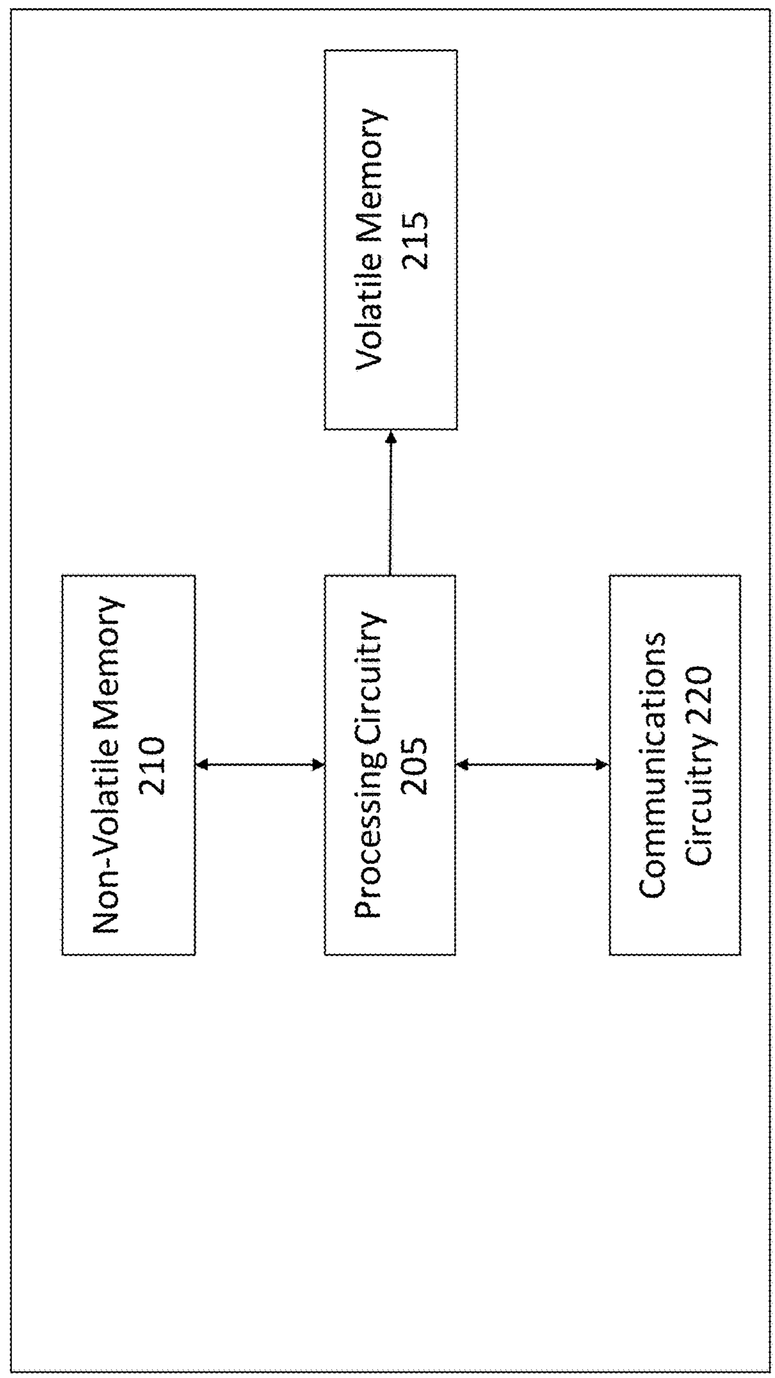

FIG. 2 provides an example predictive data analysis computing entity in accordance with some embodiments discussed herein.

Figure 3:
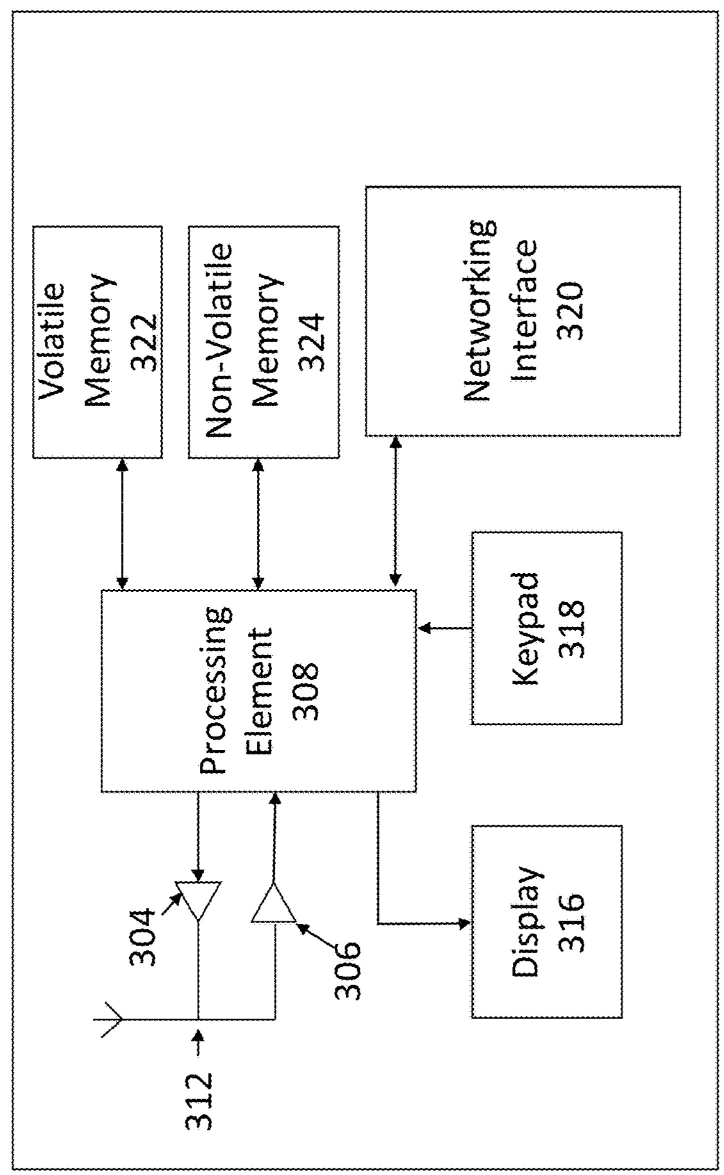

FIG. 3 provides an example external computing entity in accordance with some embodiments discussed herein.

Figure 4:
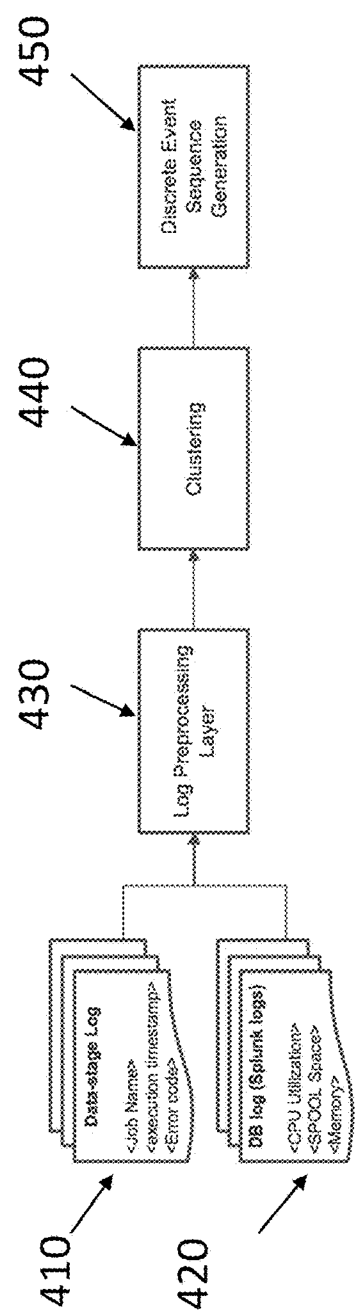

FIG. 4 provides an example data flow for converting log files to a discrete event sequence, in accordance with some embodiments discussed herein.

Figure 5:
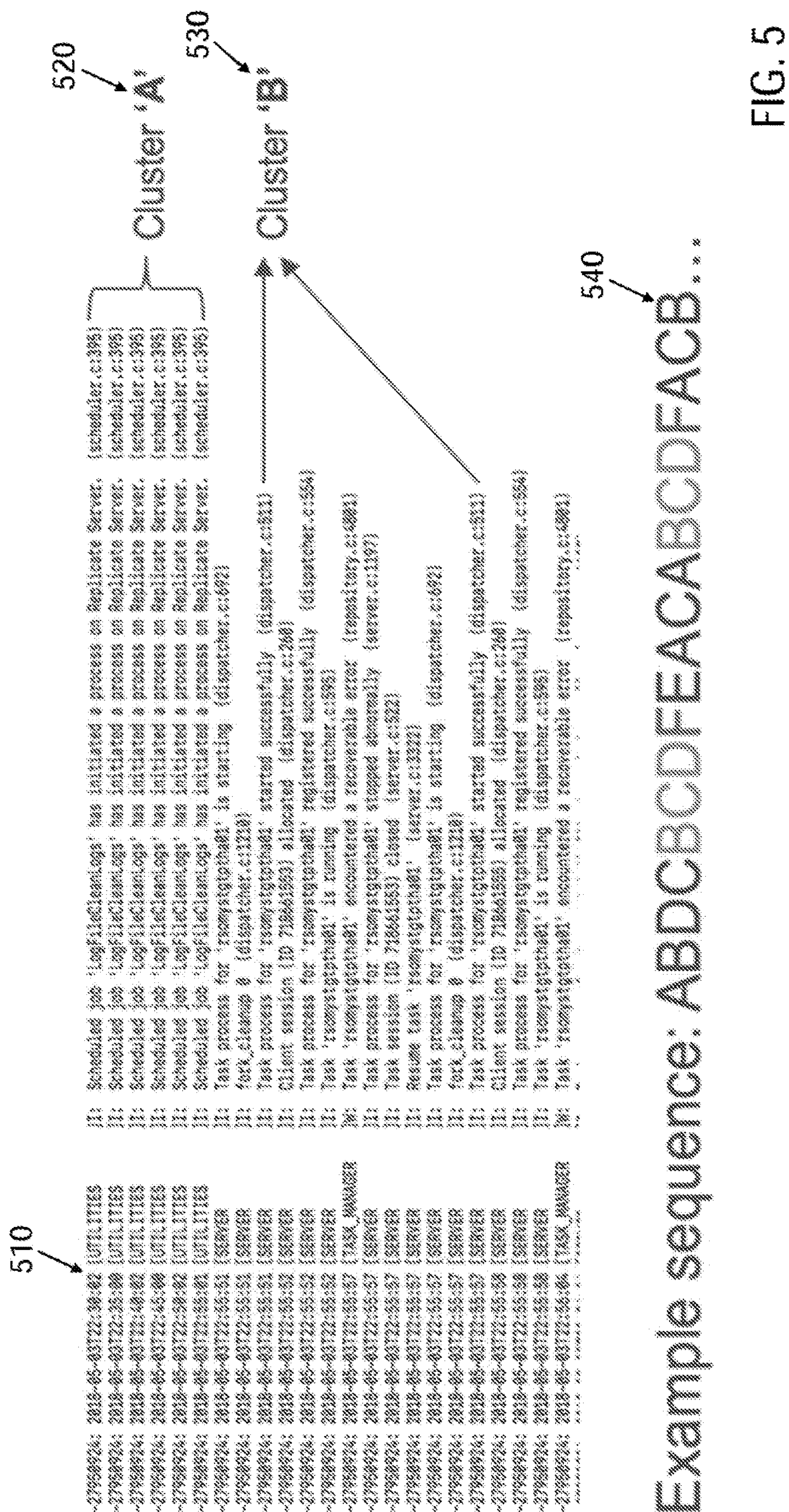

FIG. 5 provides an example output of a sequence conversion in accordance with some embodiments discussed herein.

Figure 6:
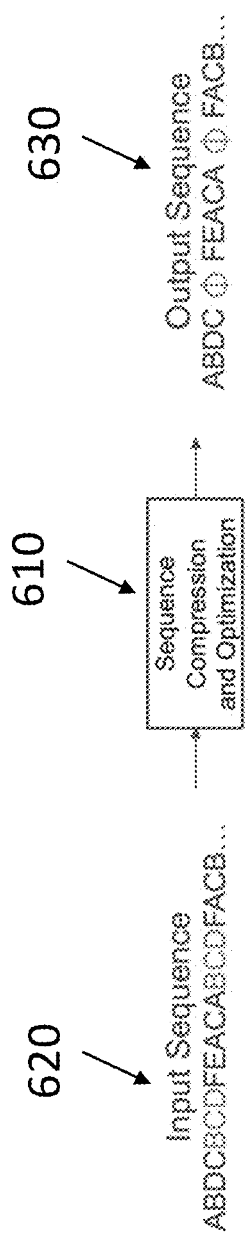

FIG. 6 graphically illustrates a compression process in accordance with some embodiments discussed herein.

Figure 7:
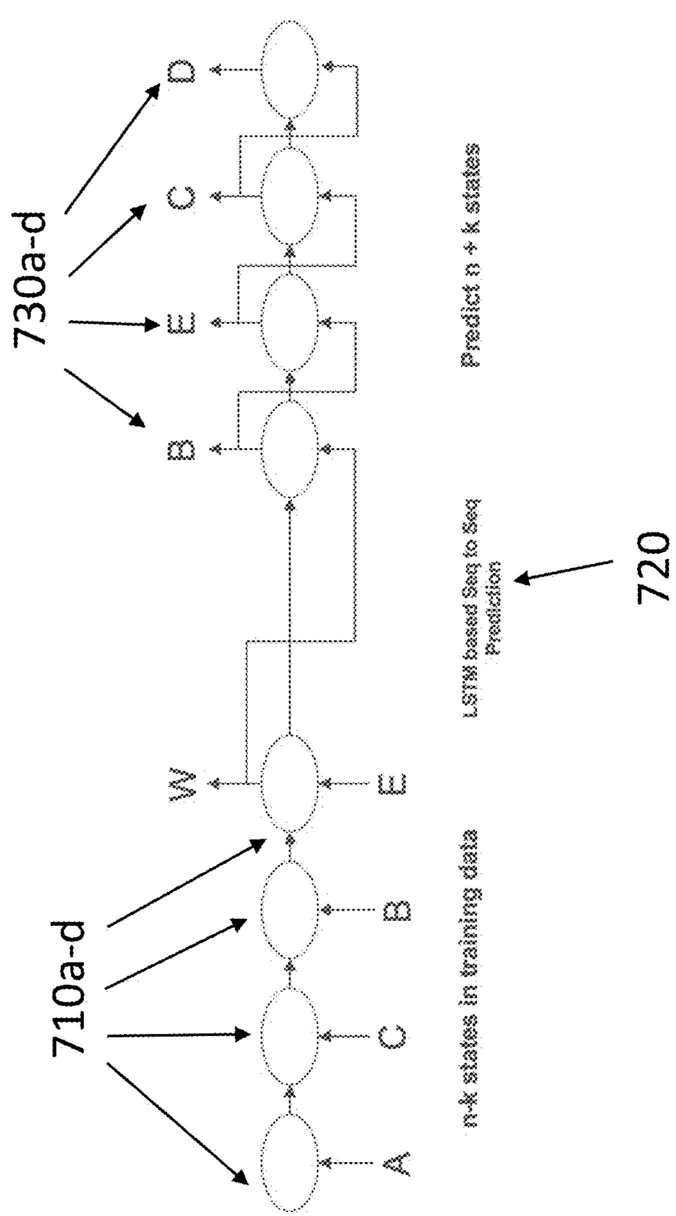

FIG. 7 graphically illustrates an encoding model for predicting a software process state in accordance with some embodiments discussed herein.

Figure 8:
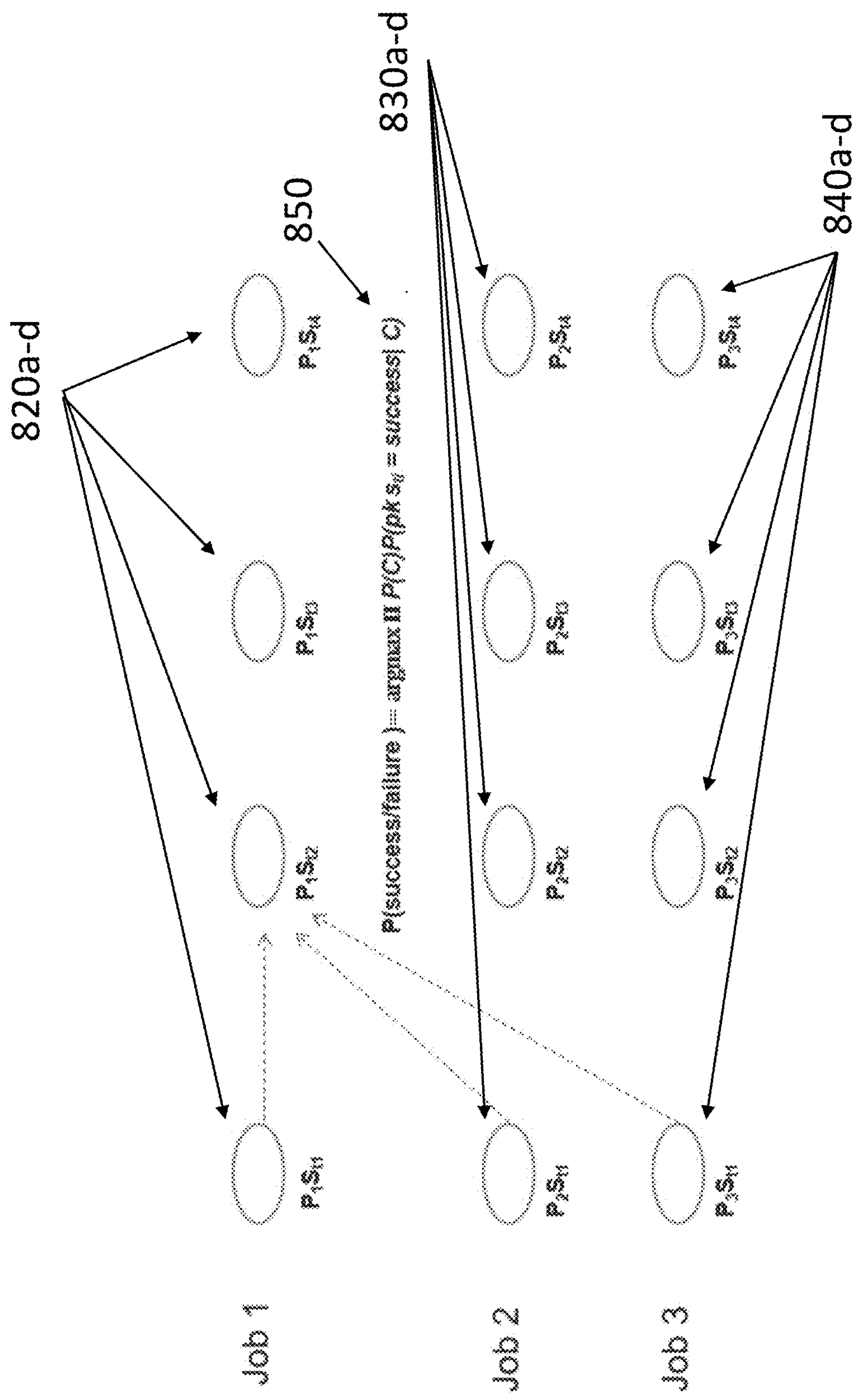

FIG. 8 graphically illustrates a cross-channel, weighted-Bayesian analysis of various states in accordance with some embodiments discussed herein.

Figure 9:
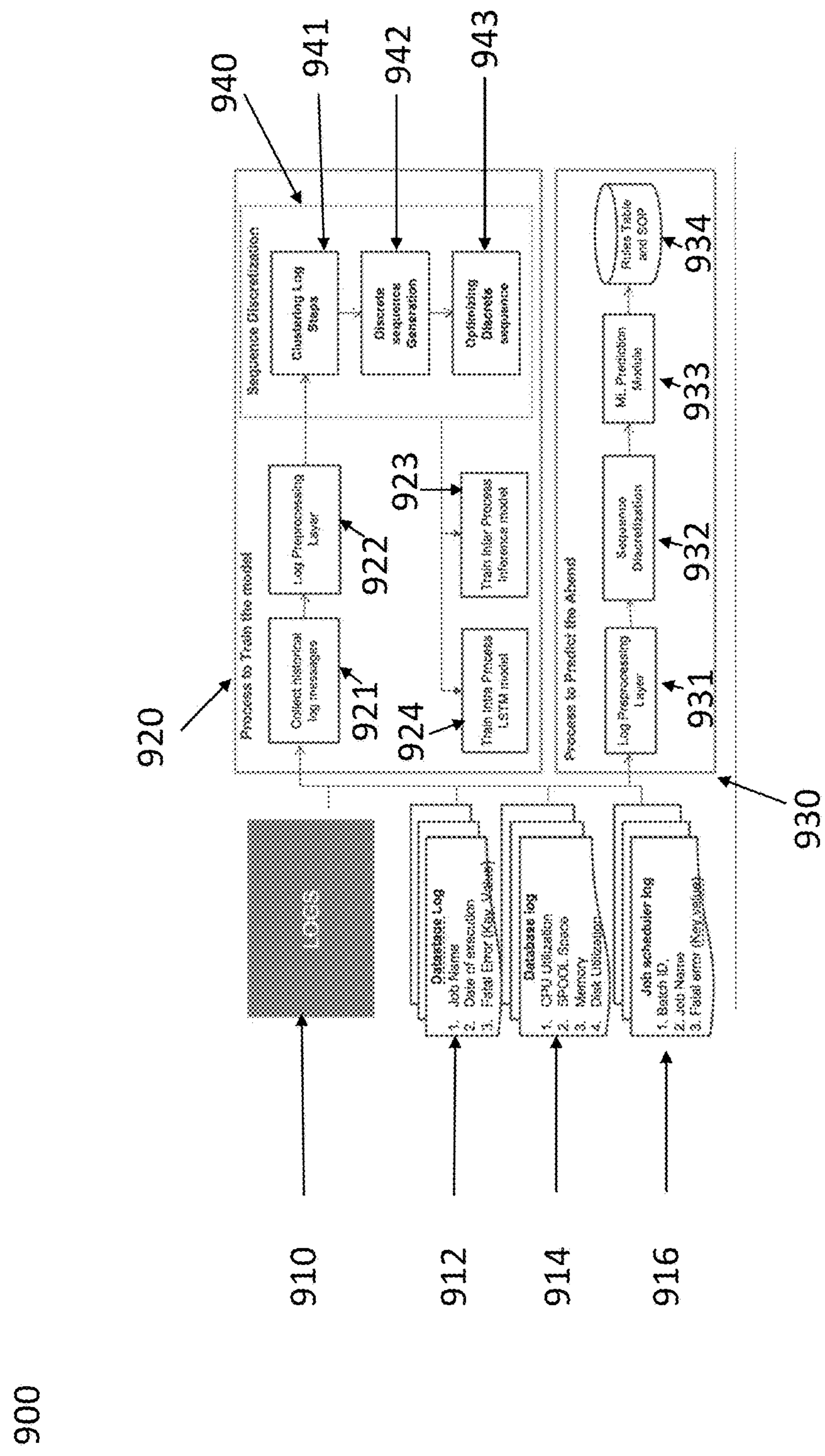

FIG. 9 graphically illustrates the overall architecture of a solution according to various embodiments.

Figure 10:
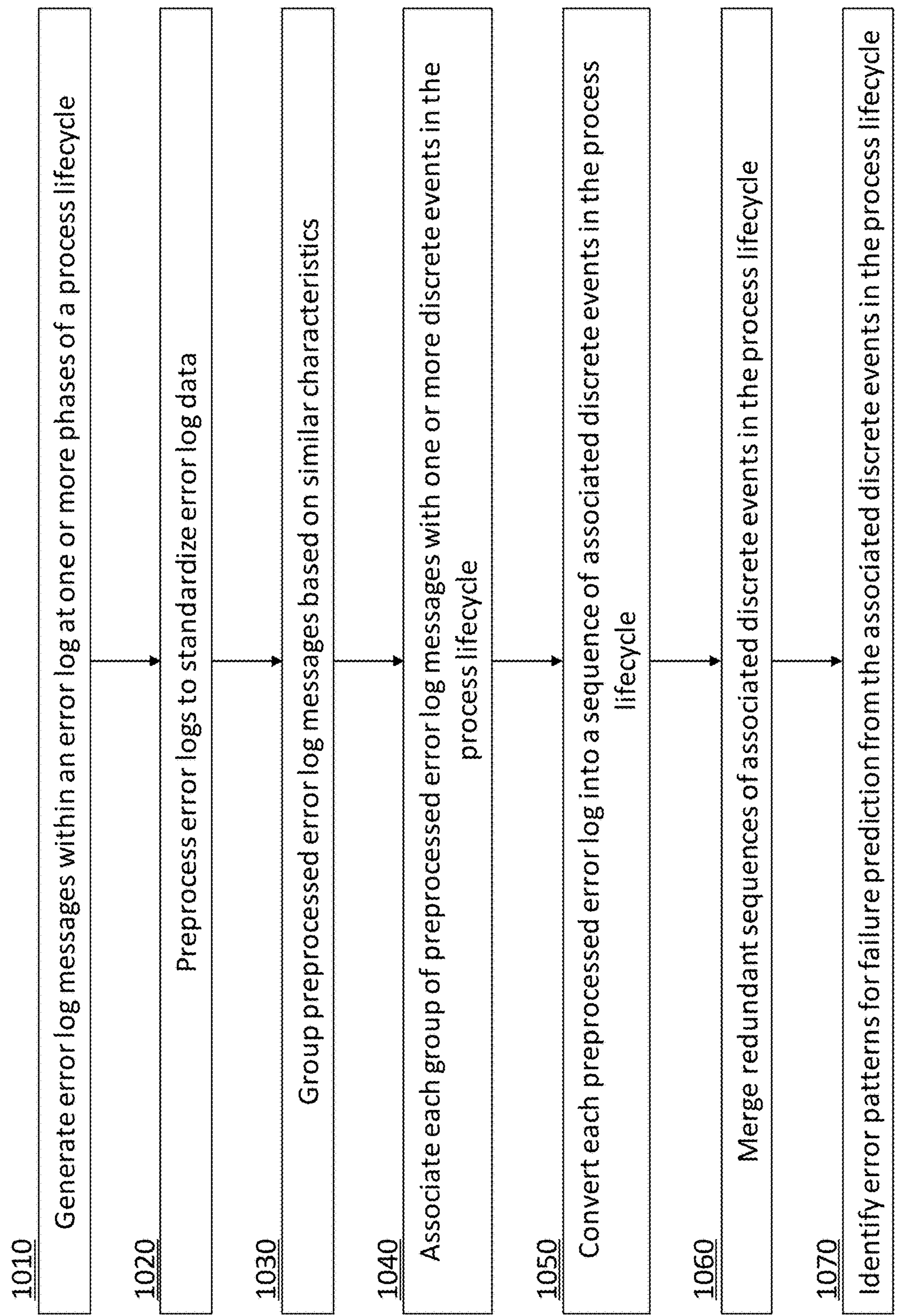

FIG. 10 is a flowchart illustrating a method in accordance with certain embodiments as discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an exemplary overview of an architecture 100 that can be used to practice embodiments of the present invention. The architecture 100 includes a predictive data analysis system 101 and one or more external computing entities 102. For example, at least some of the one or more external computing entities 102 may provide prediction inputs to the predictive data analysis system 101 and receive predictive outputs from the predictive data analysis system 101 in response to providing the prediction inputs. As another example, at least some of the external computing entities 102 may provide prediction inputs to the predictive data analysis system 101 and request performance of particular prediction-based actions in accordance with the provided predictions. As a further example, at least some of the external computing entities 102 may provide training data objects to the predictive data analysis system 101 and request the training of a predictive model in accordance with the provided training data objects. In some of the noted embodiments, the predictive data analysis system 101 may be configured to transmit parameters and/or hyper-parameters of a trained machine learning model to the external computing entities 102.

In some embodiments, the predictive data analysis computing entity 101 and the external computing entities 102 may be configured to communicate over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to train a prediction model based at least in part on the error log data 122 stored in the storage subsystem 108, store trained prediction models as part of the model definition data 121 stored in the storage subsystem 108, utilize trained models to generate predictions based at least in part on prediction inputs for example, provided by an external computing entity 102, and perform prediction-based actions based at least in part on the generated predictions. The storage subsystem may be configured to store the model definition data 121 for one or more predictive analysis models and the error log data 122 used to train one or more predictive analysis models. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 106 illustrated in FIG. 1 comprises a feature extraction engine 111, a predictive analysis engine 112, and a training engine 113. The feature extraction engine 111 may be configured to process prediction inputs from error log data 122 to identify relevant preprocessed discrete events comprising error logs data 122 for predictive data analysis processing by the predictive analysis engine 112. For example, the feature extraction engine 111 may be configured to generate a sequence of discrete software process events associated with a software process failure. The predictive analysis engine 112 may be configured to perform predictive data analysis based at least in part on the sequence of discrete software process events associated with a software process failure generated by the feature extraction engine 111. For example, the predictive analysis engine 112 may be configured to perform error predictive data analysis based at least in part on the sequence of discrete software process events associated with a software process failure generated by the feature extraction engine 111. The training engine 113 may be configured to apply supervised or unsupervised machine learning using inputs from at least one of the feature extraction engine 111 and the predictive analysis engine 112 in accordance with the error log data 122 stored in the storage subsystem 108.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications circuitry/interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. Overview and Technical Improvements

Discussed herein are methods, apparatus, systems, computing devices, computing entities, and/or the like for software process failure detection, prediction, and/or prevention based at least in part on error log messages generated during execution of software processes. To predict future software process failures, embodiments of the present invention may identify error causing patterns from a sequence of associated discrete events occurring during execution of software processes as reflected by error logs generated during the execution. Prior systems are only designed to offer solutions after failures have taken place by comparing error log data against a set of known domain defined issues and making a corresponding recommendation for rectifying an identified error that has already occurred. Embodiments of the present invention improve upon such systems by enabling corrective action prior to a failure occurring, based on software process failure prediction aspects as discussed herein. For example, embodiments enable users to take corrective action (e.g., manual corrective action), or embodiments execute one or more scripts selected based at least in part on the identified error to automatically correct one or more predicted errors.

Various embodiments encompass a smart operations enabler that can enhance an engineering pipeline containing large numbers of executing software processes by identifying patterns of error log content that are determined to occur prior to software process failures, such that the events reflected by the error log content may be determined to lead to the software process failure (e.g., via machine-learning models). These identified patterns and corresponding machine-learning models may then be used to predict software process failures by identifying a sequence of software process events that has historically prefaced (and may be determined to cause) a software process failure. In some embodiments, error log messages may be received from the pipeline after the detection of abnormal software process terminations. Over time, patterns can be identified where the patterns themselves are indicative of a source for the abnormal software process terminations. The identified patterns may also be used to learn appropriate corrective measures to prevent terminations or errors from recurring. In real-time or near real-time, various embodiments may 1) receive numerous error log messages, 2) identify patterns in content of the received error log messages that lead to the failures originating the error log messages and 3) suggest a resolution to the errors using supervised and/or unsupervised machine learning.

FIG. 4 illustrates a sample dataflow for embodiments of the present invention. Data stage logs, such as error log 410 may contain a number of attributes that describe an error and/or failure in a software process. In certain embodiments, the data stage logs may comprise metadata generated during execution of the software process. Such metadata may be indicative of various attributes of the software process, such as, error log 410 contains attributes including a "job name" (alternatively referred to as a software process name or a software process identifier). The "job name" may be an identifier of the software process in which the error occurred. Error log 410 further contains an attribute of "execution timestamp" which indicates a time at which the failed software process was executed. Error log 410 also contains an attribute of "error code" (if applicable) which may be a code (e.g., a numeric string, an alphanumeric string, and/or the like) that indicates the type of error that occurred in the software process. It should be understood that additional error attributes may be stored within a data storage log in certain embodiments. Moreover, it should be understood that an error log 410 according to various embodiments comprises log entries indicative of activities of a software process, regardless of whether those activities constitute errors and/or lead to errors. Accordingly, the error log ensures that full data regarding the activities of a software process are collected if an error is generated later (even if not predicted), such that previously unidentified correlations between activities and errors may be identified. Moreover, the error log 410 may be utilized for other purposes, such as predicting an estimated completion time of a software process, for example, based on timestamps within error log entries and/or data within error log entries indicative of a current status of completion of the software process. Moreover, error logs 410 (or one or more series of error log entries) that do not include errors may be utilized as training data to train machine-learning models to identify predictive errors within software process execution.

In certain embodiments, an error log 410 may comprise a source identifier indicative of a source of data from which a software process attempted to retrieve data. The source of data may be a database, another software process, and/or the like. However, in certain embodiments, a source identifier may be reflected within a separate log, such as database log 420, which may provide information regarding a database (or other data source) accessed (or attempted to be accessed) by the software process where the error occurred. Database log 420, for example, contains a "CPU Utilization" attribute, that indicates CPU usage for the attempted access to the database. Database log 420 further contains a "SPOOL space" attribute which may indicate a location comprises storage of relevant tables within the database. Database log 420 also contains a "Memory" attribute which may be an identifier of the relevant space where the database is stored. In certain embodiments, the database log 420 may be embodied as a portion of an error log 410 or may be embodied as a separate log that may be associated with an error log 410.

Software processes of certain embodiments have been determined to fail and produce error logs in one of a plurality of ways. As a first example, an intra-process failure may occur, and embodiments of the present invention may identify certain patterns within log messages that are indicative of actions/events that preface/are responsible for the failure of the software process. In some embodiments, a pattern may comprise a sequence of events within a software process (reflected within content of log messages) that leads to the failure of the software process. The sequence of events may be order-specific, or the order in which the events occur may be irrelevant to the occurrence of a failure. The sequences of events may be encoded and stored in one or more log files for use in identifying future potential software process failures.

A second failure type may occur during cross-channel interactions among multiple software processes. For example, when multiple software processes are running in parallel in the same environment and using a common pool of resources, the parameters of one software process may affect the execution of another parallel software process. Embodiments of the present invention may also identify patterns created by such cross-channel errors, for example, based on data indicative of actions/events occurring during execution of the one or more parallel software processes.

Various embodiments may operate in an engineering pipeline represented by an ETL (Extract, Transform, and Load)-based unified data warehouse that may comprise at least three layers: 1) data acquisition, 2) data integration and 3) data publication/subscription. In certain embodiments, each layer may concurrently run multiple batches of software processes. Some software processes may have dependencies on the completion of other software processes (e.g., the output of one software process is utilized as the input for another software process). Some software processes may be scheduled to run only at certain hours and/or within certain intervals of time. The lifecycle of a software process may begin with a software process scheduler and continue operation through a software process orchestrator. Next, a software process may continue through a data stage ending at a database management system. Each phase of the software process lifecycle may create different types of error log messages. Embodiments of the present invention consume these error logs as input for machine learning.

A. Data Collection

As a software process progresses through its lifecycle (e.g., through one or more phases of the software process lifecycle), different formats of logs may be created. These logs may comprise error logs 410 and/or database logs 420, each of which may be generated by a processor executing a software process. In certain embodiments, error logs 410 and/or database logs 420 may be generated as a part of execution of a software process. The error logs 410 may describe attributes of execution of the corresponding software process, and may be configured to provide data indicative of the execution of a software process that may ultimately lead to an error. Thus, error logs 410 may be generated regardless of whether an error is actually generated (and an error state is reached), such that the error logs 410 reflect attributes of the executing software process occurring immediately prior to an error being generated (if an error is ever generated). For example, the error logs 410 may comprise text (e.g., alphanumeric text), machine-readable content, and/or the like describing various aspects of execution of a software process. The error logs 410 may comprise log content that may be divided into identifiable portions thereof, for example, based on fixed-length fields (e.g., fixed-length fields of certain characters), based on delimiter characters (e.g., spaces, carriage returns, semicolons, and/or the like), based on characteristics of aspects of the error log (e.g., a line within an error log 410 may specify the number of subsequent lines to be grouped into a discrete portion), and/or the like. In certain embodiments, error logs 410 need not have uniform formats, as error logs 410 generated in association with different software processes and/or different phases of software processes may be characterized by different formats, content, and/or the like. In certain embodiments, a dictionary file may be utilized to correlate particular error logs with particular error log formats, so as to facilitate preprocessing to standardize error log entries. As discussed herein, the log preprocessing layer 430 of certain embodiments may be configured to distinguish between different error log 410 formats so as to retrieve data therefrom.

Similarly, database logs 420 may describe attributes of operation of a data storage source, which may be accessed by one or more executing processors to retrieve data therefrom. The database logs 420 may comprise text (e.g., alphanumeric text), machine-readable content, and/or the like describing the operation of a data source, such as data identifying one or more queries executed, data identifying particular data tables accessed (or attempted to be accessed), general data source identifiers identifying one or more portions of the database, and/or the like. Like the error logs 410, the database logs 420 may be generated regardless of whether the database state is determined to be in error, in normal operation, and/or the like.

As discussed herein, error logs 410 (and database logs 420) may comprise a content portion thereof indicative of a name/identifier of a software process associated with the error log 410 (or database log 420). The error log 410 (or database log 420) may additionally comprise content indicative of characteristics of the associated executing software process, such as errors generated/encountered during execution of the software process, external data files received/retrieved/requested during execution of the software process, processing resources utilized during execution of the software process, an execution start time (e.g., the time at which the software process started), an execution duration (e.g., the length of time that the software process has been executing when the error log 410 was generated), and/or the like. In certain embodiments, software processes may cause generation of a plurality of error logs 410, for example, at fixed time intervals, upon the occurrence of a trigger event (e.g., the generation of an error), and/or the like, and the generation of one or more error logs 410 may be memorialized within the error log itself with a corresponding timestamp indicating when the error log 410 was generated. In other embodiments, software processes may cause generation of a single error log 410, for example, that may be updated periodically, continuously, and/or the like, while the related software process is executing (and each update may be memorialized with a corresponding timestamp indicating when the update occurred). In the latter embodiments, a single error log 410 may comprise a plurality of log entries, each log entry comprising content that may be divided into individual content portions as discussed herein. It should be understood that the following discussions, which describe execution of software processes with respect to separate error logs 410 may be equally applicable to separate error log entries 410 within a single error log 410, and the log preprocessing layer 430 may be configured to extract each error log entry for separate treatment.

Each error log may have an error section (e.g., a fixed-length section, a delimited section, and/or the like) providing a description of the error that resulted in the termination of the software process. The error section may comprise human-readable codes, machine-readable codes, and/or the like that are indicative of a generated error. In certain embodiments, the description may be provided as a hash, or otherwise as a compressed data string. Error logs may typically range from about 200 to 400 characters long, although shorter or longer error logs may be utilized in certain embodiments. The error log characters may contain 1) a string of characters representing the description of the error, 2) a string of characters representing the name of the code or script within the software process that is failing and 3) a string of characters representing code or script line numbers identifying the exact point at which the error is triggered. In some embodiments, the error log characters may further contain character strings representing details of tables within a database that the software process attempts to access during a data acquisition process. In that case, the characters of the error log may further contain character strings identifying a database query executed by the software process corresponding to the error log. Historical error logs may be stored in a historical error log database for future access when identifying patterns between multiple errors.

B. Data Preprocessing

In some embodiments of the present invention, error log 410 and/or database log 420 may be inputs to a log preprocessing layer 430.

In certain embodiments, each received error log may be passed through the log preprocessing layer 430. The log preprocessing layer 430 may contain multiple data cleaning steps. For example, the log preprocessing layer 430 may identify and remove unnecessary punctuation marks from the characters in the error log. In certain embodiments, one or more stop words (e.g., words that may be removed without substantially impacting the meaning of the error code content, such as "the," "a," "of," "to," and/or the like. The log preprocessing layer 430 may execute one or more additional standardization processes, if necessary, so as to standardize the content of one or more error logs 410. Next, some embodiments may execute a tokenizer of the log preprocessing layer 430 to tokenize at least a portion of the remaining characters in the error log 410. The generated tokens may represent any of a variety of attributes of the error log 410, such as script names identified using regular expressions built for a fixed set of script extensions. In certain embodiments, tokens representing script names may be determined to represent the identity of one or more scripts and/or software programs executing as a part of an engineering pipeline. At least a portion of the tokens identified in the error log may then be masked.

Within the tokens generated for each of a plurality of error logs 410, the preprocessing layer 430 may next identify tokens and/or sequences of alphanumeric characters that represent a data source identifier of a database (or other data source) which an executing software process accessed/attempted to access. These tokens and/or identified sequences of alphanumeric characters may then also be masked and may be associated with tokens identifying the script/executing software process. Next, queries executed by software processes for data acquisition processes may be identified within individual error logs 410 and parsed to extract the names of relevant data sources, such as database tables and/or other database attributes of interest. In some embodiments, a specific keyword search may be implemented on the generated tokens and/or error log characters to identify actions being performed on the data by the software process that are of particular relevance (e.g., as determined based at least in part on user input) to a user.

In certain embodiments, the preprocessing layer 430 may be further configured to standardize error logs 410, for example by generating a columnized version of the error logs 410 for further utilization (e.g., by a clustering module 440). As just one example, the preprocessing layer 430 may be configured to separate content of error logs 410 into individual columns, for example, based at least in part on fixed field lengths within error logs 410, delimiting characters within error logs 410, and/or other determinations of discrete portions of the error logs 410. As just one example, columns may be generated for error logs 410, wherein columns comprise respective data indicative of: a software process identifier (e.g., tokenized data indicative of a script name or software process name), data indicative of one or more errors generated/encountered during execution of a software process, data indicative of one or more data sources contacted/attempted to be contacted during execution of the software process, and/or the like. It should be understood that the preprocessing steps may be user-configurable based on the desired output. For example, a user may provide input specifying one or more columns to be included within error logs 410.

C. Clustering to Identify Categories

Log preprocessing layer 430 may then provide the preprocessed error logs to a clustering module 440. The columns of error logs may be passed through clustering module 440. In certain embodiments, the clustering module 440 may be configured to execute one or more machine-learning models, such as unsupervised clustering models, to identify related error logs 410. As just one example, the clustering module 440 may be configured to identify related error logs 410 by identifying matching identifier data within the error logs 410 (e.g., each error log comprises an identical or at least substantially similar identifier of a software process therein), matching data source identifier data within the error logs 410, and/or the like.

In some embodiments, the clustering may comprise a plurality of clustering steps. In certain embodiments, a number of possible groups may be determined by, for example, applying gap statistics methodology or other methodology for determining an optimal number of clusters to the columnized error logs. Next, the determined number of groups may be generated using K-means algorithms or other clustering methods, based on the determined optimal number of clusters. The generated groups of error logs may be expected to have similar features and/or column values. For example, one generated cluster may contain error logs referencing the same database tables (or other data source as indicated by a data source identifier) or error logs executing similar data queries (as indicated by a query identifier). The resulting cluster may then be cleaned by embodiments of the present invention such that each cluster corresponds to one similar logged step or activity. In certain embodiments, one or more clusters may be compressed in certain embodiments to facilitate further processing, for example, by replacing the content of the clusters with a defined representative character, symbol, and/or the like.

D. Discrete Event Generation and Sequencing

In some embodiments, a clustering module 440 may provide error logs 510 to a discrete event sequence generation module 450 for generation of a sequence 540. FIG. 5 illustrates an example log file 510 and a corresponding example sequence 540 as may be generated by the event sequence generation module 450. Particularly, a log file 510 is illustrated as comprising one or more error logs (or compressed representations of one or more error logs). Within a log file 510, the discrete event sequence generation module 450 may be configured to identify discrete events reflected by a series of related error logs 410 within the log file 510. In certain embodiments, the discrete event sequence generation module 450 may be configured to tag each discrete event (e.g., each error log 410 reflecting a discrete event) to distinguish between discrete events within the log file 510 and, such that a log file 510 represents a sequence of events associated with one or more software processes. In certain embodiments, the discrete event sequence generation module 450 may execute a machine-learning model, such as a supervised or unsupervised clustering model to distinguish between events reflected within log files 510. As discussed herein, the log file 510 may comprise a plurality of columnized error logs 410, such that the log file 510 is embodied as a matrix of a plurality of rows and columns, wherein each error log 410 is reflected within one or more rows within the log file 510. Accordingly, the machine-learning model is configured to identify particular rows (e.g., portions of the matrix) collectively reflecting a particular event. It should be understood that the machine-learning model may be configured to identify an event as encompassing a single row (e.g., a single error log 410) or a plurality of rows (e.g., a plurality of error logs 410).

Log files 510 may then be subdivided to generate data reflecting each discrete event. As just one example, the discrete event sequence generation module 450 may be configured to generate data files each reflecting a discrete event. Moreover, the discrete event sequence generation module 450 may be configured to generate and apply a timestamp to discrete events, for example, based on one or more timestamps associated with individual error logs 410. As just one example, a timestamp generated for a discrete event may match an earliest timestamp of the individual error logs 410 of the discrete event, such that the timestamp reflects an event initiation timestamp. As another example, a timestamp generated for a discrete event may be determined to be an average of all timestamps of individual error logs 410 of the discrete event, such that the timestamp reflects an average execution time of the discrete event. As yet another example, a timestamp generated for a discrete event may match a latest timestamp of the individual error logs 410 of the discrete event, such that the timestamp reflects an event completion timestamp.

In certain embodiments, the discrete event sequence generation module 450 may be further configured to group one or more discrete events into clusters for further analysis. For example, the discrete event sequence generation module 450 may generate a cluster A 520 comprising a first group of discrete events that are similar to each other (e.g., having similar characteristics) within the group based at least in part on contained error logs and a cluster B 530 comprising a second group of discrete events based at least in part on contained error logs. Moreover, each cluster may be compressed, and represented by a character, a symbol, and/or the like to facilitate further processing.

In certain embodiments, the discrete event sequence generation module 450 may be further configured to identify one or more discrete sequences 540 each representing a sequence of discrete events generated by event sequence generation module 450. The sequence of discrete events may comprise a chronological sequence of discrete events. In certain embodiments, the discrete events within a cohesive, chronological sequence of discrete events may originate from a plurality of log files 510, such that the sequence of discrete events reflects a comprehensive sequence of discrete events of a plurality of discrete event types. Such a sequence of discrete events may be utilized as discussed herein to identify potential patterns of combinations of discrete events that lead to one or more errors.

Each group of error logs within a discrete event may be considered to be associated with a single coherent and logical event in the execution of a software process lifecycle, and the discrete event (e.g., a data file representing the discrete event) may comprise content identifying the associated event. For example, identified lines in a log file 510 may correspond to a particular task that forms an event. For example, certain lines in the log file 510 pertaining to error codes may be grouped to represent a single event. By extension, individual lines within raw error logs 410 may be determined to correspond to a discrete event (or a portion of a discrete event). In some embodiments of the present invention, a user may define certain steps logged in an error log as a distinct event. Each identified event may be associated with a timestamp or series of timestamps reflected within a log file 510 and indicative of one or more times at which particular events were initiated, when particular events (or subportions of events) occurred, and/or the like. Accordingly, the timestamps within each log file 510 may be utilized by the discrete event sequence generation module 450 to identify temporally related log files 510 and/or to determine a chronological series of a plurality of log files 510, thereby enabling determinations of temporal relatedness of a plurality of log files 510. In some embodiments, each logged event or group of logged events may also correspond to a particular state of the underlying executing software process, such as a normal-function state, an error state, and/or the like. Specifically, error logs 410 may comprise data identifying a state of an executing software process, and the discrete event sequence generation module 450 (or another module) may be configured to generate state data files based at least in part on the data identifying the state of the executing software process (which may be tokenized in certain embodiments), data identifying a software process/script identifier, a timestamp associated with the error log 410, and/or the like. The software states may be reflected by a series of discrete events, such that software states are not separately tracked from events. In other embodiments, the discrete event sequence generation module 450 is further configured to generate a sequence of software process states as a chronological sequence identifying software process states for the executing software process. The sequence of software process states may comprise a plurality of software process state data, arranged in chronological order so as to reflect the operating state of one or more software processes at various states in time (as reflected by associated timestamps). In certain embodiments, separate sequences of software process states are generated for each executing software process, however it should be understood that a single, cohesive sequence of software process states may be generated encompassing data reflecting software process states of a plurality of executing software processes. Thus, a sequence of discrete events may parallel a sequence of software process states (or may encompass a sequence of software process states), thereby enabling a determination of discrete events occurring prior to the initiation of a particular state.

E. Sequence Optimization

Certain embodiments may optimize each generated sequence of discrete events. FIG. 6 illustrates an embodiment of the functionality of a sequence compression and optimization module 610 that may be integrated into discrete event sequence generation module 450. The sequence compression and optimization module 610 may be configured to compress redundancies (e.g., redundant sequences of discrete events) existing in a generated sequence of discrete events generated as discussed above from error log files. The optimization process executed by the sequence compression and optimization module 610 may remove and merge redundant sequences from the generated sequence of discrete events and replace the redundant sequences of discrete event with a compressed representation thereof. For example, input sequence 620 may be optimized by sequence compression and optimization module 610 to produce an optimized output sequence 630. Sequence compression and optimization module 610 may identify repetitive groups of discrete events (e.g., portions of the sequence of discrete events) such as "BCD" within the illustrated example of FIG. 6. The identified repetitive groups of discrete events groups may be compressed. In the illustrated example, sequence compression and optimization module 610 may compress the repetitive "BCD" sequence to "J".

Such optimization may result in a compressed sequence of discrete events that may provide better performance at the failure prevention stages. In some embodiments, compression algorithms (such as "GoKrimp") may be modified and employed based on user-defined parameters for a current task to achieve better performance. However, it should be understood that unique compression algorithms may be utilized in certain embodiments. For example, in some embodiments, the compression algorithms may be based on business rules and domain knowledge.

F. Process Abend/Failure Prediction

Certain embodiments may use the generated sequence of discrete events (e.g., after compression) to identify intra-processes patterns that lead to software process failures. In certain embodiments, a deep learning algorithm may be used for sequence prediction. If the predicted sequence contains failure-causing code, then embodiments of the present invention may recommend corrective action. In some embodiments, a LSTM (long short-term memory) supervised deep learning model may be employed as a RNN (recurrent neural network) model for sequence to sequence failure predictions, similar to multi-step forecasting. The supervised deep learning may occur on an auto encoder-decoder-based LSTM network. Such predictions may be useful for predicting intra-process errors.

FIG. 7 illustrates an embodiment of LSTM sequence to sequence prediction. LSTM training data 710*a*-710*d* may represent a number of software process states and/or sequences as reflected within the compressed sequence of events. Specifically, the training data 710*a*-710*d* reflects a plurality of pairs of input (or "source") data reflecting a first sequence of events and output (or "target") data reflecting a second sequence of events that occurs chronologically after the first sequence of events, such as within a single software process or a plurality of related software processes. The pairs of input data and output data are configured to enable the LSTM deep learning model to learn correlations between sequences of events reflected within input data and sequences of events reflected within output data. In various embodiments, the training data 710*a*-710*d* comprises compressed data indicative of one or more sequences of events (e.g., a first sequence of events reflecting the input data and a second sequence of events reflecting the output data). It should be understood that the pairs of input data and output data provided within the training data need not reflect a continuous series of events (e.g., such that the events reflected in the output data need not occur immediately after the events reflected in the input data). As an example, the series of events reflected by the input data may be separated by the series of events reflected in the output data (e.g., with one or more events occurring between the input data and the output data). Moreover, the length of the sequence of events reflected within the input data need not match the length of the sequence of events reflected within the output data. For example, the input data may be reflective of a sequence of 10 events occurring within a software process, and the output data may be reflective of a single event (e.g., an error causing event) occurring within the same software process. As another example, the input data may be reflective of a single event occurring within a software process, and the output data may be reflective of a series of events (e.g., a series of events that ultimately culminates in an error). In certain embodiments, one or more components of the LSTM sequence to sequence prediction model may be adjustable (e.g., manually or automatically) so as to accommodate differences in length of the input data and/or output data. For example, an activation function (e.g., selected as tan h), a kernel weight initializer (e.g., weights assigned to input values, such as in vector form), a bias initializer (e.g., bias weights assigned to input values, such as in vector form), regularizers for kernel and bias, and dropout layers may be configured based at least in part on the length of the input data sequences and/or output data sequences, the extent of correlation within a sequence (e.g., a gap within a continuous sequence of events between the sequence of events reflected within the input data and the sequence of events reflected within the output data), and/or the like.

As noted above, sequences of events may be parallel to and/or reflective of sequences of states. For example, an event in an executing software process may indicate a corresponding state of the software process at a particular point in time. Accordingly, the training data may comprise historical data indicative of the sequence of events (e.g., an input sequence of events and an output sequence of events), thereby enabling the deep learning model to identify patterns between the input sequence of events and the output sequence of events. An LSTM prediction module 720 may receive and utilize LSTM training data 710*a*-710*d* to generate a deep learning model configured to generate predictions of software process events based on an input of sequence data. Accordingly, the LSTM prediction module 720 is thereafter configured to receive sequence data inputs (e.g., in real-time or near real-time) and to apply the generated deep learning model to generate predicted software process events. In certain embodiments, the LSTM prediction module 720 is thereafter configured to receive data indicative of actual sequence of events in the executing software process that resulted from the input sequence of events, and to utilize the combination of the predicted sequence of events with the actual sequence of events of the executing software process to further refine the deep learning model.

G. Cross Channel Process Abend/Failure Prediction

Certain embodiments are configured to generate software process failure predictions in instances in which there are multiple software processes running in parallel. In certain instances, multiple software processes may be dependent upon one another. For example, multiple software processes may utilize a common data source for execution of software processes. As another example, multiple software processes may utilize shared resources (e.g., shared RAM, shared processing time, and/or the like) for execution. In such circumstances, a software process may fail due to intra-process factors (e.g., a first software process overutilizing shared resources, such that a second software process cannot properly execute) and subsequently cause the failures of other software processes that may have been dependent upon it. Since multiple software processes run in the same environment (e.g., in parallel or in series) and may use a common pool of resources, various embodiments are configured to identify and/or predict errors and failures that take place due to these multiple concurrent software processes.

In some embodiments, these concurrent software processes may be processed to gather data regarding their respective discrete sequences of events (as discussed above, sequences of events (which may be reflective of states) may be generated separately for each software process, or the sequences of events for multiple software processes may be reflected within a single, composite sequence of events (e.g., with each event comprising an identifier associating a particular software process with the event)), such that the sequences of events may be analyzed (e.g., via a deep learning model configured to identify correlations between input sequences of events and output sequences of events that may be reflective of particular software process states, such as error states). As discussed above, the deep learning model, such as a LSTM neural network model, may utilize training data comprising input data reflective of a first sequence of events (e.g., which may encompass events occurring via multiple software processes) and output data reflective of a second sequence of events (e.g., which may encompass events occurring via multiple software processes) occurring chronologically after the first sequence of events, so as to identify correlations between particular input data and output data. The correlations between input data and output data may then be utilized by the deep learning model to predict sequences of events that are likely to occur based on a given input, and accordingly the deep learning model is configured to generate predictions of event sequences across software processes utilizing the developed deep learning model.

Next, a weighted Bayesian variational inference model may be constructed to study the effects of a software process failure. The weighted Bayesian variational inference model may be a supervised machine-learning model configured to determine the probability of a software process failure conditioned on events occurring in execution of multiple software processes (e.g., multiple dependent software processes). Weights may be assigned by the weighted Bayesian variational inference model to each event occurring during execution of the multiple software processes (each event being provided as input parameters to the weighted Bayesian variational interference model). The input parameters may demonstrate a degree of effect of each software process has on a given concurrent software process. The weighted Bayesian variational inference model may thereafter generate an output indicative of a probability of a software process failure, given a set of inputs (e.g., discrete events) detected based at least in part on error logs 410.

FIG. 8 illustrates an embodiment of the weighted Bayesian variational inference model 810. Job 1 820, job 2 830 and job 3 840 (alternatively referred to as "software process 1," "software process 2," and "software process 3," respectively) each may represent a respective software process P1, P2, and P3. Each illustrated nodule, such as nodules 820*a-d*, nodules 830*a-d* and nodules 840*a-d*, represents an event corresponding to a particular software process and the corresponding state of that software process at a certain point of time corresponding to the timestamp of the event. In some embodiments, the weighted Bayesian variational inference model 810 calculates a cross-channel weighted Bayesian analysis for each nodule. For example, equation 850 may calculate the weighted Bayesian analysis as a probability of successfully executing a particular software process versus a probability of failing to execute a particular software process.

H. Recommend Corrective Action

In certain embodiments, systems store one or more standard operating procedures (SOPs) for handling various failure types within a memory. In certain embodiments, the SOPs are stored in a table, associating failure types (e.g., identified with a failure type identifier) with corresponding SOPs for handling the failure type. Accordingly, upon determining that a particular failure of a software process is likely, and identifying a failure type (e.g., by a failure type identifier), the system is configured to retrieve a corresponding SOP for addressing the failure. In certain embodiments, the system may be configured to automatically execute one or more portions of the SOP to mitigate software process failures. However, in other embodiments, the system may be configured to transmit or otherwise present the SOP to a user (e.g., a user of the software process) to enable the user to take appropriate remedial action to address the software process failure.

IV. Exemplary System Operations

In general, embodiments of the present invention provide methods, apparatus, systems, computing devices, computing entities, and/or the like for predicting software process failure. FIG. 9 illustrates an exemplary system architecture 900 according to embodiments of the present disclosure. Exemplary system architecture 900 may comprise any number of system logs 910. For example, system logs 910 may include datastage error log 912, database log 914 and job scheduler log 916. In some embodiments, job scheduler log 916 may comprise any number of attributes about a batch of software processes in which a related software process caused an error. Log data from system logs 910 may be provided to both a machine learning module 920 and a failure prediction module 930.

In some embodiments, machine learning module 920 may comprise collection module 921 that collects historical log message data. Collection module 921 may then provide output to log processing layer 922 (having functions analogous to that discussed above in reference to log preprocessing layer 430) that may process the log data into a format to be used by sequence discretization module 940. Sequence discretization module 940 may pass the processed log data through a clustering module 941 (having functionality analogous to the clustering module 440 discussed above) for grouping. Clustering module 941 may then pass the grouped data to a discrete sequence generation module 942 (having functionality analogous to the discrete event sequence generation module 450 discussed above) for the generation of a number of discrete sequences of events associated with the relevant software process. Discrete sequence generation module 942 may pass the generated discrete sequences of events to discrete sequence optimizing module 943 for the optimization of the data in the generated discrete sequences.

In some embodiments, sequence discretization module 940 may pass the optimized sequence data to both an inter-process inference model 923 and an intra-process inference model 924, to provide machine learning data for both single and concurrent software processes as discussed herein.

In some embodiments, failure prediction module 930 may comprise log preprocessing layer 931 to preprocess error log data as described above. Log preprocessing module 931 may then pass preprocessed log data to sequence discretization module 932 for generating discrete sequence data based at least in part on the preprocessed data. Sequence discretization module 932 may then pass the discrete sequence data to machine learning prediction module 933. Machine learning prediction module 933 may then provide failure prediction data to a rules table database 934 for use in the future prediction of software process errors.

FIG. 10 illustrates a flowchart of certain embodiments of the present disclosure. At block 1010, the method may comprise generating error logs at one or more phases of a software process lifecycle in association with execution of a software process. For example, a particular software process may experience an error or failure condition that triggers an engineering pipeline to generate an error log (or content within an error log reflecting an error). The error log may be associated with a particular phase of the software process lifecycle where the error or failure occurred. In some embodiments, each error log may further comprise one or more of: a code identifier identifying error causing code, one or more line numbers associated with identified error causing code, table details comprising details of one or more database tables (or other data sources as reflected by data source identifiers) that identified error causing code attempts to access, and identification of one or more queries executed to attempt to access the one or more database tables (as reflected by query identifiers). In some embodiments, each error log may comprise a description of at least one fatal software process error.

At block 1020, each error log may be preprocessed as discussed above to standardize error log data. In some embodiments, software processes reflected by block 1020 may comprise the steps of: removing one or more unnecessary punctuation marks and/or stop words from each error log; tokenizing text in each error log to create one or more error log tokens; identifying one or more error log tokens representing script names/software process names in each error log; masking the identified one or more error log tokens; identifying one or more sequences of alphanumeric characters in each error log, wherein the sequences of alphanumeric characters represent identifications of one or more databases; identifying one or more regular expressions in each error log, wherein the one or more regular expressions represent identifications of software processes; masking the identified one or more sequences of alphanumeric characters; masking the identified one or more regular expressions; parsing each error log to identify one or more data acquisition queries; and extracting one or more database tables of interest and one or more attributes of interest associated with the identified one or more data acquisition queries.

In some embodiments, data may be extracted from each error log based on a keyword search as discussed above. In some embodiments, one or more error log tokens may be identified representing script names in each error log by using one or more expressions built for a fixed set of script extensions.

At block 1030, the preprocessed error logs may be grouped based on similar characteristics of the preprocessed error logs as discussed above. In some embodiments, block 1030 may further comprise: determining a number of groups to characterize the preprocessed error logs using gap statistics (or other methodology for determining an optimal number of groups for characterizing error logs) and grouping the preprocessed error logs into the determined number of groups using k-means algorithms (or other methodology for grouping the error logs into the determined optimal number of groups) such that each grouping corresponds to a similar activity performed during the software process lifecycle.

At block 1040, each group of preprocessed error logs may be associated with one or more discrete events of the software process lifecycle. In some embodiments, each associated discrete event of the software process lifecycle corresponds to a state of the software process associated (e.g., via corresponding time stamps) with the associated discrete event. At block 1050, each preprocessed error log may be converted into a sequence of associated discrete events of the software process lifecycle. In some embodiments, each associated discrete event of the software process lifecycle corresponds to a state associated with the associated discrete event.

At block 1060, sequences of associated discrete events of the software process lifecycle may be merged and/or compressed as discussed above (e.g., identified redundant sequences of discrete events). In some embodiments, the sequences may be compressed based on business rules and/or domain knowledge. For example, redundant sequences determined (e.g., from historical data) to have little impact on software process errors may be compressed, while other redundant sequences may remain uncompressed so as to enable a more granular determination of whether those sequences impact software process errors.

At block 1070, one or more error causing patterns may be identified for software process failure prediction from the sequences of associated discrete events of the software process lifecycle. In some embodiments, a deep learning model may be applied to create predicted sequences of associated discrete events (and corresponding software process states) based at least in part on detected software process sequences identified from error logs. In certain embodiments, the predicted sequences of associated discrete events may have corresponding probabilities (e.g., probability scores) associated therewith, wherein the probability scores are indicative of a likelihood that a particular software process state will occur based on the detected software process sequences identified from error logs.

In some embodiments, one or more error causing patterns may be identified from the sequences of associated discrete events of the software process lifecycle using a weighted Bayesian variational inference model, wherein the sequences of associated discrete events of the software process lifecycle represent concurrent jobs. The weighted Bayesian variational inference model may provide an error probability for sequences of associated discrete events of the software process lifecycle. The weighted Bayesian variational inference model may further weight provided inputs for sequences of associated discrete events of the software process lifecycle.

In some embodiments, the identified one or more error causing patterns from the sequences of associated discrete events of the software process lifecycle may be stored in a table organized by type of pattern and predicted failures. In certain embodiments, the table may additionally comprise data indicative of recommended actions to remediate/mitigate the effects of a predicted error

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for software process failure prediction, the computer-implemented method comprising:

generating error log messages in real time based at least in part on execution of a software process by a computer processor, wherein the error log messages are generated within one or more error logs stored in one or more memory storage areas in association with the computer processor at one or more phases of a software process lifecycle of the executing software process;

preprocessing each error log stored within the one or more memory storage areas to standardize error log data during execution of the software process;

grouping the preprocessed error log messages within the one or more memory storage areas based at least in part on shared characteristics of the preprocessed error logs;

identifying, based at least in part on groups of preprocessed error log messages, one or more groups of preprocessed error log messages reflecting one or more discrete events of the software process lifecycle;

converting a plurality of the preprocessed error logs into a sequence of associated discrete events of the software process lifecycle;

compressing sequences of associated discrete events of the software process lifecycle into one or more compressed data objects; and identifying one or more error causing patterns for software process failure prediction in real time during execution of the software process from the one or more compressed data objects reflecting sequences of associated discrete events of the software process lifecycle at least in part by:

training a deep learning model based at least in part on a plurality of pairs of input data and output data to create predicted sequences of associated discrete events associated with one or more errors in a software process lifecycle, wherein the input data reflects a first sequence of discrete events and the output data reflects a second sequence of discrete events, and wherein the second sequence of discrete events reflects a state selected from: a normal-function state or an error state; and applying the deep learning model to create predicted sequences of associated discrete events associated with one or more errors in the software process lifecycle.

2. The computer-implemented method for software process failure prediction of claim 1, wherein each error log further comprises one or more of: a code identifier identifying error causing code, one or more line numbers associated with identified error causing code, a retrieval data source identifier, and identification of one or more queries executed to attempt to access one or more data sources tables.

3. The computer-implemented method for software process failure prediction of claim 1, wherein preprocessing each error log to standardize error log data comprises one or more of:

removing one or more punctuation marks from each error log;

tokenizing text in each error log creating one or more error log tokens;

identifying one or more error log tokens representing script names in each error log;

masking the identified one or more error log tokens;

identifying one or more data source identifiers represented as character sequences in each error log;

masking the identified one or more data source identifiers;

identifying one or more software process identifiers within each error log;

masking the identified one or more software process identifiers;

parsing each error log to identify one or more data acquisition queries; and extracting one or more data source identifiers of interest and one or more attributes of interest associated with the identified one or more data acquisition queries.

4. The computer-implemented method for software process failure prediction of claim 1, further comprising storing the identified one or more error causing patterns from the sequences of associated discrete events of the software process lifecycle in association with data identifying corresponding predicted failures.

5. The computer-implemented method for software process failure prediction of claim 1, further comprising identifying one or more error causing patterns from the sequences of associated discrete events of the software process lifecycle using a weighted Bayesian variational inference model, wherein the sequences of associated discrete events of the software process lifecycle represent concurrent software processes.

6. The computer-implemented method for software process failure prediction of claim 5, wherein the weighted Bayesian variational inference model further provides an error probability for sequences of associated discrete events of the software process lifecycle.

7. The computer-implemented method for software process failure prediction of claim 5, wherein the weighted Bayesian variational inference model further weights provided inputs for sequences of associated discrete events of the software process lifecycle.

8. The computer-implemented method for software process failure prediction of claim 1, wherein each associated discrete event of the software process lifecycle corresponds to a software process state associated with the associated discrete event.

9. The computer-implemented method for software process failure prediction of claim 1, wherein grouping the preprocessed error logs further comprises:

determining a number of groups to characterize the preprocessed error logs using gap statistics; and grouping the preprocessed error logs into the determined number of groups using k-means algorithms such that each grouping corresponds to a similar activity performed during the software process lifecycle.

10. The computer-implemented method for software process failure prediction of claim 1, wherein each error log comprises a description of at least one fatal software process error.

11. The computer-implemented method for software process failure prediction of claim 1, wherein preprocessing each error log to standardize error log data further comprises extracting data from each error log based at least in part on a keyword search.

12. The computer-implemented method for software process failure prediction of claim 1, wherein preprocessing each error log to standardize error log data further comprises: identifying the one or more error log tokens representing script names in each error log by using one or more expressions built for a fixed set of script extensions.

13. The computer-implemented method for software process failure prediction of claim 1, wherein the error logs are formatted based at least in part on the phase at which they are respectively generated.

14. An apparatus for software process failure prediction, the apparatus comprising at least one processor and at least one memory including program code, the at least one memory and the program code configured to, with the processor, cause the apparatus to at least:

generate error log messages in real time based at least in part on execution of a software process by the at least one processor, wherein the error log messages are generated within one or more error logs stored in the at least one memory at one or more phases of a software process lifecycle of the executing software process;

preprocess each error log stored within the at least one memory to standardize error log data during execution of the software process;

group the preprocessed error log messages within the at least one memory based at least in part on shared characteristics of the preprocessed error logs;

identify, based at least in part on groups of preprocessed error log messages, one or more groups of preprocessed error log messages reflecting one or more discrete events of the software process lifecycle;

convert a plurality of the preprocessed error logs into a sequence of associated discrete events of the software process lifecycle;

compressing sequences of associated discrete events of the software process lifecycle into one or more compressed data objects; and identify one or more error causing patterns for software process failure prediction in real time during execution of the software process from the one or more compressed data objects reflecting sequences of associated discrete events of the software process lifecycle at least in part by:

training a deep learning model based at least in part on a plurality of pairs of input data and output data to create predicted sequences of associated discrete events associated with one or more errors in a software process lifecycle, wherein the input data reflects a first sequence of discrete events and the output data reflects a second sequence of discrete events, and wherein the second sequence of discrete events reflects a state selected from: a normal-function state or an error state; and applying the deep learning model to create predicted sequences of associated discrete events associated with one or more errors in the software process lifecycle.

15. The apparatus for software process failure prediction of claim 14, wherein the program code is further configured to, with the processor, cause the apparatus to at least:

remove one or more punctuation marks from each error log;

tokenize text in each error log creating one or more error log tokens;

identify one or more error log tokens representing script names in each error log;

mask the identified one or more error log tokens;

identify one or more data source identifiers represented as character sequences in each error log;

mask the identified one or more data source identifiers;

identify one or more software process identifiers within each error log;

mask the identified one or more software process identifiers;

parse each error log to identify one or more data acquisition queries; and extract one or more data source identifiers of interest and one or more attributes of interest associated with the identified one or more data acquisition queries.

16. The apparatus for software process failure prediction of claim 15, wherein the program code is further configured to, with the processor, cause the apparatus to at least:

apply a deep learning algorithm to create predicted sequences of associated discrete events associated with one or more errors in the software process lifecycle.

17. A computer program product for software process failure prediction, the computer program product comprising at least one non-transitory computer-readable storage medium having computer-readable program code portions stored therein, the computer-readable program code portions configured to, when executed by a processor, cause the processor to:

generate error logs in real time based at least in part on execution of a software process by a computer processor, wherein the error logs are generated within one or more memory storage areas in association with the processor at one or more phases of a software process lifecycle of the executing software process;

preprocess each error log stored within the one or more memory storage areas to standardize error log data during execution of the software process;

group the preprocessed error logs within the one or more memory storage areas based at least in part on shared characteristics of the preprocessed error logs;

identify, based at least in part on groups of preprocessed error logs, one or more groups of preprocessed error logs reflecting one or more discrete events of the software process lifecycle;

convert a plurality of the preprocessed error logs into a sequence of associated discrete events of the software process lifecycle;

compressing sequences of associated discrete events of the software process lifecycle into one or more compressed data objects; and identify one or more error causing patterns for software process failure prediction in real time during execution of the software process from the one or more compressed data objects reflecting sequences of associated discrete events of the software process lifecycle at least in part by:

training a deep learning model based at least in part on a plurality of pairs of input data and output data to create predicted sequences of associated discrete events associated with one or more errors in a software process lifecycle, wherein the input data reflects a first sequence of discrete events and the output data reflects a second sequence of discrete events, and wherein the second sequence of discrete events reflects a state selected from: a normal-function state or an error state; and applying the deep learning model to create predicted sequences of associated discrete events associated with one or more errors in the software process lifecycle.

18. The computer program product for software process failure prediction of claim 17, wherein the computer-readable program code portions are further configured to:

remove one or more punctuation marks from each error log;

tokenize text in each error log creating one or more error log tokens;

identify one or more error log tokens representing script names in each error log;

mask the identified one or more error log tokens;

identify one or more data source identifiers represented as character sequences in each error log;

mask the identified one or more data source identifiers;

identify one or more software process identifiers within each error log;

mask the identified one or more software process identifiers;

parse each error log to identify one or more data acquisition queries; and extract one or more data source identifiers of interest and one or more attributes of interest associated with the identified one or more data acquisition queries.

* * * * *